United States Patent [19]
Ishii et al.

[11] Patent Number: 5,458,664
[45] Date of Patent: Oct. 17, 1995

[54] PARTICULATE TRAP FOR PURIFYING DIESEL ENGINE EXHAUST

[75] Inventors: Masayuki Ishii; Masaaki Honda; Tetsuya Nishi; Satoru Okamoto, all of Itami, Japan

[73] Assignee: Sumitomo Electric Industries, Ltd., Osaka, Japan

[21] Appl. No.: 185,983
[22] PCT Filed: May 13, 1992
[86] PCT No.: PCT/JP92/00634
  § 371 Date: Jan. 10, 1994
  § 102(e) Date: Jan. 10, 1994
[87] PCT Pub. No.: WO93/23144
  PCT Pub. Date: Nov. 25, 1993
[51] Int. Cl.[6] ............................................. B01D 46/00
[52] U.S. Cl. ..................... 55/282; 55/523; 55/DIG. 10; 55/DIG. 30; 60/311
[58] Field of Search ................... 55/282, 523, DIG. 10, 55/DIG. 30; 60/295, 303, 311

[56] References Cited

U.S. PATENT DOCUMENTS

| | | | |
|---|---|---|---|
| 4,687,579 | 8/1987 | Bergman | 55/523 |
| 4,758,272 | 7/1988 | Pierotti et al. | 55/523 |
| 5,009,857 | 4/1991 | Haerle | 55/523 |
| 5,114,447 | 5/1992 | Davis | 55/523 |
| 5,171,341 | 12/1992 | Merry | 55/523 |
| 5,318,606 | 6/1994 | Geibel et al. | 55/523 |

FOREIGN PATENT DOCUMENTS

| | | | |
|---|---|---|---|
| 0402738 | 12/1990 | European Pat. Off. . | |
| 54-5273 | 1/1979 | Japan | 55/523 |
| 55-11024 | 1/1980 | Japan . | |
| 57-10319 | 1/1982 | Japan . | |
| 57-4216 | 1/1982 | Japan | 55/523 |
| 58-151417 | 10/1983 | Japan . | |
| 58-166823 | 11/1983 | Japan . | |
| 59-119319 | 8/1984 | Japan . | |
| 63-117115 | 5/1988 | Japan . | |
| 1371705 | 2/1988 | U.S.S.R. | 55/DIG. 10 |

*Primary Examiner*—C. Scott Bushey
*Attorney, Agent, or Firm*—Wenderoth, Lind & Ponack

[57] ABSTRACT

In combination with a diesel engine, a particulate trap for purifying the diesel exhaust of the engine includes a case provided in the exhaust line of the diesel engine and a filter element mounted in the case. The filter element is a porous member of a heat-resistant metal framework having the form of a three-dimensional mesh. The surface roughness of the metal framework is at least 0.2 μm. The pores of the porous member have an average diameter of 0.1–1 mm, the average number of such pores as counted in the thickness direction of the porous member is 10 or more, the volume packing density of the filter element to the entire filtering space is 10–40%, and the filter has a gas inflow filtration area of 400 cm$^2$ per liter of the displacement of the engine to which the trap is to be mounted. The filter element has a high capacity to collect particulates and can withstand thermal shock during regeneration and yet produces little pressure drop in the exhaust line during filtration.

22 Claims, 4 Drawing Sheets

PARTICULATE TRAP FOR PURIFYING DIESEL ENGINE EXHAUST

BACKGROUND OF THE INVENTION

This invention relates to a particulate trap for collecting and removing particulates such as carbon contained in exhaust gas discharged from a diesel engine.

Exhaust gas discharged from car engine is one of the major causes of air pollution. It is therefore important to develop techniques for removing harmful components contained in exhaust gas.

It is especially important to remove particulates contained in the exhaust gas discharged from diesel engines, which are mainly NOx and carbon.

Heretofore, various efforts have been made to remove such harmful components before the exhaust is discharged from the engine. Such efforts include putting EGR (exhaust gas recirculation) on the engine and improving a fuel injector and the shape of a combustion chamber. However none of these measures is a definitive solution. Another known measure is to provide an exhaust trap in the exhaust passage to collect the particulates contained in the exhaust (as proposed in Unexamined Japanese Patent Publication 58-51235). This method in which the exhaust is treated after being discharged from the engine, is considered more practical and has been studied vigorously.

Such a particulate trap for collecting particulates in exhaust gas has to satisfy the following requirements in view of the conditions of use.

First, it has to be capable of collecting particulates with such a high efficiency that the exhaust is cleaned sufficiently. Each country sets by law a different upper limit of the particulate emissions. For example, the Japanese government has set a long-term target of upper limit at 0.08 g/Km in the 10-mode test in passenger cars, light trucks and buses, which is to be attained by the year 2000. In the U.S., the 1994 EPA restriction has set such an upper limit at 0.1 g/HP.Hr for heavy-duty cars in the transient mode and at 0.08 g/mile for light-duty cars in the LA-4 mode. These are pretty tough regulations. The amount of particulates contained in the exhaust depends on the displacement of the diesel engine and the load applied. However it is generally considered that such a trap has to be capable of collecting, on the average, 60% or more of the particulates in the exhaust to meet such regulations.

Secondly, the pressure drop of exhaust gas must not be so large. As the exhaust gas passes through the trap and the particulates therein are collected by the trap, its resistance to gas flow increases. If the resistance is too great, an undesirable back pressure will act on the engine. It is therefore necessary to restrict such back pressure below 30 KPa after collecting particulates. For this purpose, it is necessary that not only the initial pressure drop be sufficiently low, but the resistance to the flow of exhaust be small, i.e. the pressure drop does not rise too much even after the particulates have been collected.

Furthermore, it is necessary to periodically remove the collected particulates when a predetermined amount of particulates has been collected to regenerate the trap so that it can regain its initial particulate collection capacity. Thus, the third requirement for a particulate trap is that it is tough enough to endure repeated regeneration treatments. It is considered the most promising regeneration method to burn particulates with an electric heater or a burner. In either case, the collected particulates have to be heated to a temperature higher than the ignition point of the particulates (usually 600° C.). Recycling treatment, i.e. the burning of the collected particulates, has to be completed before the back pressure increases to such a degree that the engine performance drops or the drivability worsens. After regeneration, particulates are collected again. Trappings and regenerations are repeated. Thus, the pressure drop is always kept at a level below a predetermined value. It is therefore important that the filter element be made of a material which can not only sufficiently withstand the repeated regeneration treatments but show sufficiently high resistance to corrosion by the atmospheric gas contained in the exhaust.

The above requirements are met if a honeycomb-shaped porous member made of cordierite ceramic is used as the filter member in the particulate trap. Such a filter is also considered most practical. However with this conventional arrangement, in which the particulates collected by the cordierite ceramic are burned, the filter is repeatedly heated to a rather high temperature. Thus, the filter frequently melted or developed cracks due to thermal shock when the filter was heated for regeneration and then cooled down.

Because this type of filter element has a problem in that the regeneration control is extremely difficult, it is not practically used yet.

SUMMARY OF THE INVENTION

The present invention was made to solve the above-mentioned problems and its object is to provide a particulate trap for purifying diesel engine exhaust which can collect particulates with high efficiency while not increasing the pressure drop and which can withstand thermal shocks when it is heated and cooled for regeneration.

For this purpose, it is necessary that the pores of the filter elements for collecting particulates have a suitable diameter and that the filtering parts of the filter elements such as their fibers and framework be thick enough so that they can collect particulates easily. The particulate collection capacity is also influenced by the size and surface condition of the particulate collection portions of the filter elements.

In order to satisfy both of the mutually conflicting requirements for higher particulate collection capacity and for lower back pressure, it is necessary to design a trap so as to have a fairly large filtration area at the exhaust inflow side while keeping the entire trap compact.

In order to attain the above object, the present inventors found out that a trap having three-dimensional mesh-like porous filter elements made of a heat-resistant metal and having communicating pores has a high particulate collection capacity, is less likely to increase pressure drop and is difficult to melt or crack due to temperature increase when the collected particulates are burned for regeneration.

The metallic three-dimensional mesh-like porous material may be, e.g. a porous metal (made by Sumitomo Electric Industries under the name of "Celmet") produced by subjecting a foamed urethane having communicating pores and having a three-dimensional mesh-like structure to conductivity-imparting treatment and electroplating it.

Figure 1:
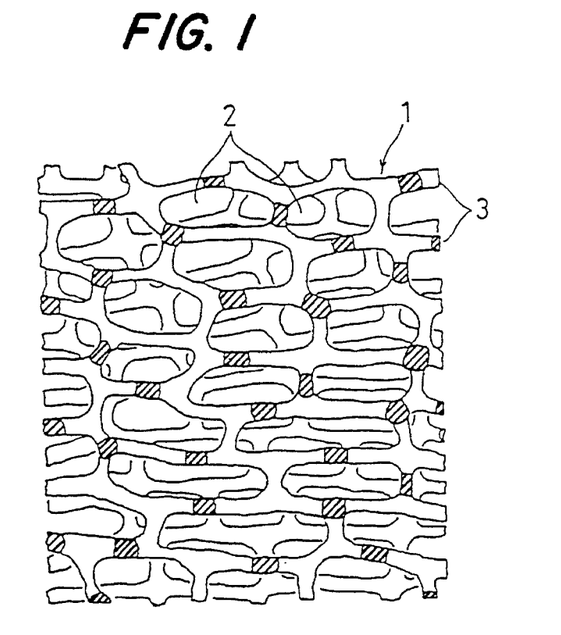
FIG. 1 is an enlarged view of a three-dimensional mesh-like porous member having communicating pores.

As shown in FIG. 1, the three-dimensional mesh-like porous member is a porous framework or skeleton 3 having pocket-like pores 2. Since it has a high porosity, once particulates are collected in the pores, they cannot easily escape despite the fact that the resistance to the gas flow is relatively low. In other words, it has a high particulate collection capacity.

The present inventors also tried to determine the proper ranges of the pore diameter of the three-dimensional mesh-like porous member having communicating pores, the number of pores as counted in the thickness direction of the filter element, and the volume packing density at which the metal framework or skeleton occupies to the entire filtering space, and the relation between the exhaust inflow filtration area of the filter element per liter of the displacement of the engine to which the trap is mounted and the particulate collection capacity and the pressure drop.

The relation between the pore diameter of the communicating pores formed in the three-dimensional mesh-like porous member and the filter performance will first be described. The pore diameter of the three-dimensional mesh-like porous member has to be determined so as to provide for both high particulate collection capacity and low pressure drop in a balanced manner. The term "pore diameter" used herein refers to the diameter of the pores formed in the porous framework and corresponds to the diameter of the bubbles formed when the three-dimensional mesh-like porous member is formed by foaming. It was found out that the average pore diameter should be 0.1–1 mm for collection efficiency. If the average pore diameter is less than 0.1 mm, though the particulate collection efficiency improves, the resistance to air-flow will increase quickly to such an extent that the back pressure on the engine exceeds 30 KPa, which puts too heavy a load on the engine. If the average pore diameter is more than 1 mm, an increased amount of the particulates will pass through the filter element without getting collected, especially while the filter element is new or immediately after the filter has been regenerated. Thus, the particulate collection efficiency will drop below 60%.

The present inventors also examined the preferable range of the number of pores in the thickness direction when using the porous material as a filter. If the average number of pores having diameters of 0.1–1 mm as counted in the thickness direction of the filter element (including any pore crossed even the least bit by a line extending in the thickness direction) is 10 or less, the collection capacity tends to be too low.

If the volume packing density of the metal skeleton of the three-dimensional porous filter element to the entire filtering portion is less than 10%, the particulates are less likely to collide with and attach to the framework. The particulate collection capacity is also low. If the ratio is more than 40%, though the collection capacity is high, the pressure drop tends to increase to an unacceptably high level. Thus, the ratio is preferably not more than 40%.

If the exhaust inflow filtration area of the filter element per liter of the displacement of the engine to which the trap is to be mounted is 400 cm$^2$ or less, this means that the inlet of the filter element through which the particulates pass is too small. Thus, the exhaust tends to flow at a rather high speed through the filtering portion, thereby unduly increasing the pressure drop.

Further, the present inventors examined in detail the relation between the projected width of section of the metal framework making up the three-dimensional mesh-like porous member (projected length of a side of a section of the metal framework) and the filter performance. As a result, it was found out that the filter performance is good if the projected width is 20 µm or more. If less than 20 µm, an increased part of the particulates tend to pass through the metal framework without colliding with it, resulting in reduced particulate collection capacity. Thus, the projected width of the framework should preferably be not less than 20 µm.

The present inventors also examined the relation between the surface roughness Rmax of the metal framework forming the three-dimensional mesh-like porous member and the particulate collection capacity and the pressure drop. As a result, it was found out that, by using a three-dimensional mesh-like porous member having a surface roughness Rmax of 0.2 µm or more, the filter performance improved sufficiently. If the surface roughness Rmax is less than 0.2 µm, the particulates once collected tend to be blown away by the subsequent exhaust gas flow, resulting in reduced particulate collection capacity as a whole. The greater the Rmax value, the higher the initial particulate collection capacity tends to be. However as the amount of particulates collected increases, the surface condition of the framework has a smaller influence on the particulate collection capacity. By controlling the surface roughness of the framework, it is possible to improve the initial particulate collection capacity.

BRIEF DESCRIPTION OF THE DRAWINGS

FIGS. 4(A)–9(A) are vertical sectional views of various embodiments of the particulate trap.

FIG. 4(B)–9(B) are cross sectional views thereof.

DETAILED DESCRIPTION OF THE PREFERRED EMBODIMENTS

The particulate trap for cleaning exhaust discharged from a diesel engine according to the present invention is formed of a three-dimensional mesh-like porous member as described hereinbelow.

Figure 2:
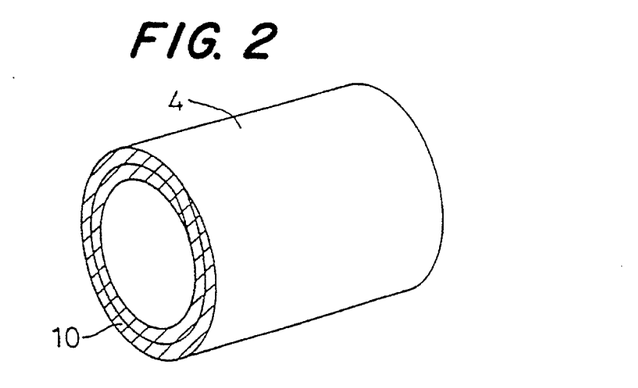
FIG. 2 is a perspective view of a filter element formed by spirally winding a three-dimensional mesh-like porous sheet.
Figure 3:
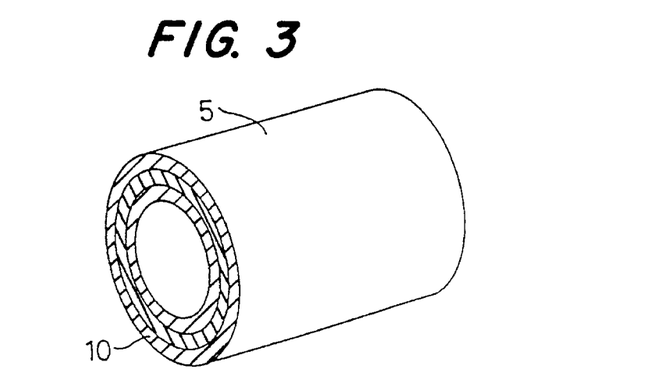
FIG. 3 is a perspective view of another filter element formed by concentrically arranging a plurality of three-dimensional mesh-like porous sheets one on another.

FIGS. 2 and 3 show filter elements of different types. FIG. 2 is a perspective view of a filter element 4 in the form of a spirally wound porous sheet 10 of a heat-resistant metal and having a three-dimensional mesh-like structure. FIG. 3 is a perspective view of a filter element 5 comprising a plurality of cylindrical sheets 10 having a three-dimensional mesh-like structure and concentrically arranged one on another.

Figure 4A:
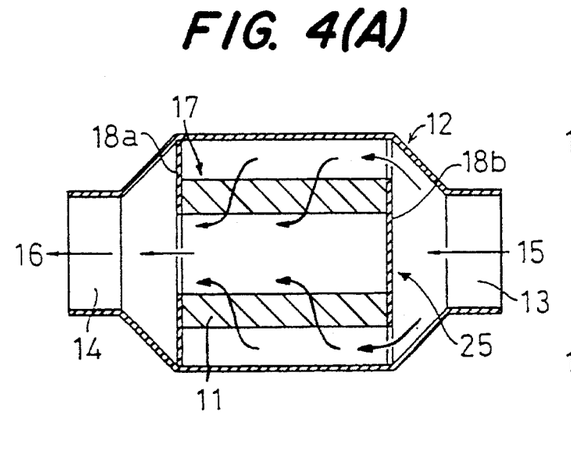
Figure 4B:
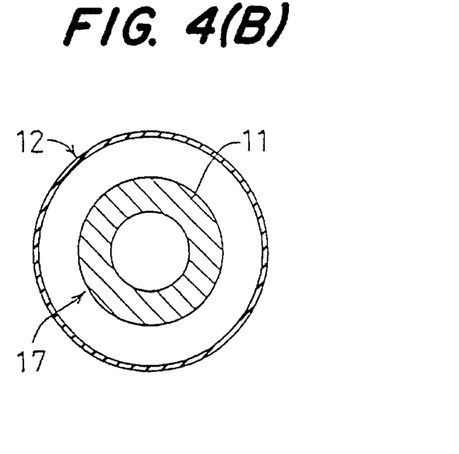
Figure 5A:
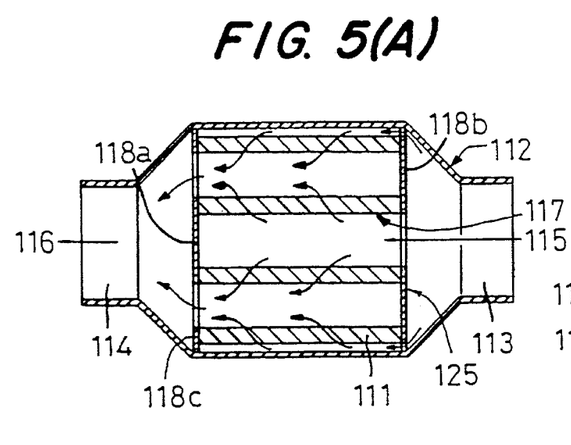
Figure 5B:
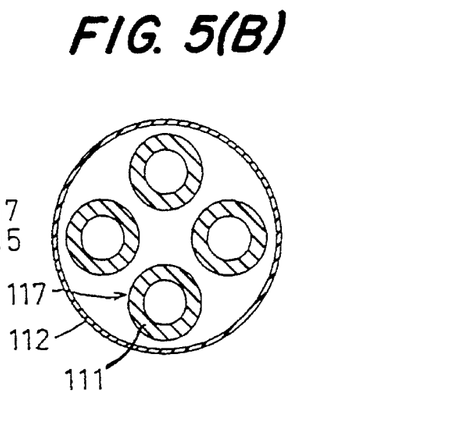

FIGS. 4(A) and 4(B) show an embodiment in which a single filter element 17 is mounted in a case. 12. FIGS. 5(A) and 5(B) show another embodiment in which a plurality of filter elements 117 are mounted in a case 112.

The particulate trap for purifying the exhaust discharged rom a diesel engine is mounted in the exhaust passage of the diesel engine to collect and remove particulates discharged from the diesel engine. It comprises a case 12 or 112 having an exhaust gas inlet port 13 or 113 and an exhaust gas outlet port 14 or 114, and a filter element 17 or filter elements 117.

The filter elements 17 and 117 are a three-dimensional mesh-like porous member 11 or 111 made of a heat-resistant metal and having communicating pores. It has the shape of a spiral member 4 as shown in FIG. 2 or comprises a plurality of concentric cylindrical layers as shown in FIG. 3. The single filter element (FIG. 4) or the plurality of filter elements (FIG. 5) are mounted in the case 12 or 112, respectively. Closure members 18a, 18b or 118a, 118b are provided to close, alternately, the gap defined between the outer surface of the cylindrical member(s) and the inner surface of the case at one end of the casing and the opened end of the cylindrical member(s) at the other end of the casing.

The filter element(s), of a three-dimensional mesh-like porous member made of a heat-resistant metal, has communicating pores having an average diameter of 0.1–1 mm, the average number of pores as counted in the thickness direction of the porous member being 10 or more, the volume packing density of the metal framework to the entire filtering space being 10–40%, and the filter having a gas inflow filtration area of 100 $cm^2$ per liter of the displacement of the engine to which the trap is to be mounted.

Figure 6A:
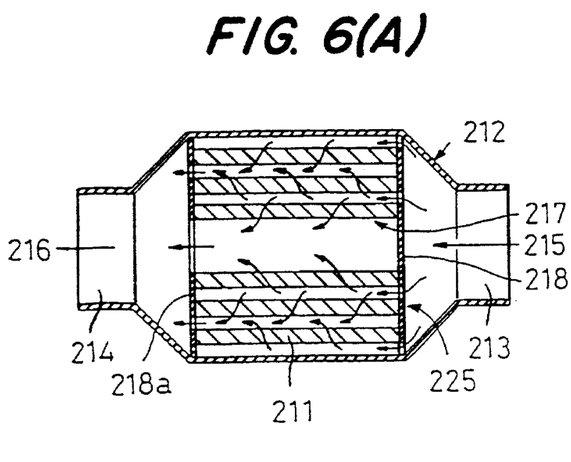
Figure 6B:
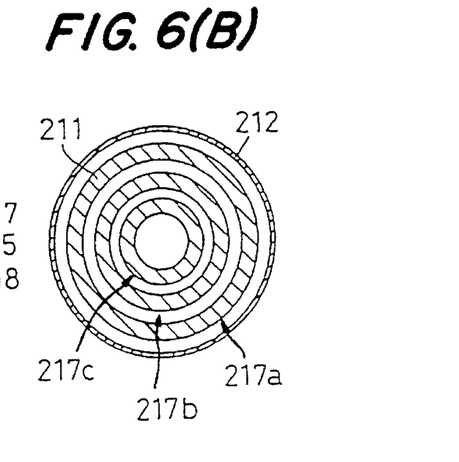

FIGS. 6(A) and 6(B) show one embodiment to increase the gas inflow filtration area of the filter element and thus to restrain the back pressure while collecting particulates and improve the particulate collection efficiency.

In the embodiment of FIGS. 6(A) and 6(B), the particulate trap comprises a case 212 and filter 217 in the form of three-dimensional mesh-like porous members 211 made of a heat-resistant metal having communicating pores 2. The filter elements 217a, 217b and 217c of the filter 217 are concentric cylindrical members that have different diameters and are spaced apart a predetermined distance from one another. The gap defined between the inner surface of the case and the outermost cylindrical member, the gaps between the adjacent cylindrical members and the open end of the innermost cylindrical member are closed alternately at the gas inlet 213 side and at the gas outlet 214 side by closure member 218, 218a.

Again, the communicating pores have an average diameter of 0.1–1 mm, the average number of the pores as counted in the thickness direction of the filter element being 10 or more, the volume packing density of the metal framework to the entire filtering space of the filter element being 10–40%, and the filter element having a gas inflow filtration area of 400 $cm^2$ or more per liter of the displacement of the engine to which the trap is to be mounted.

Figure 7A:
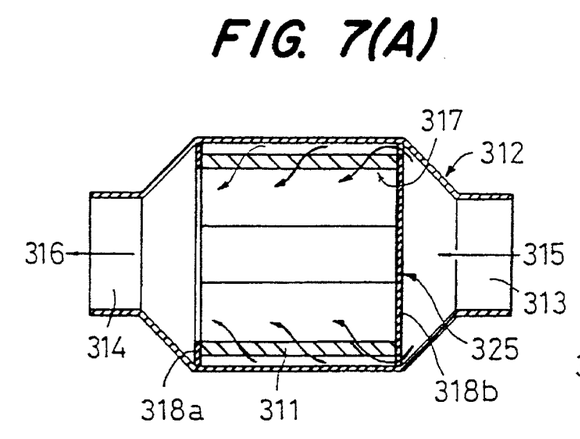
Figure 7B:
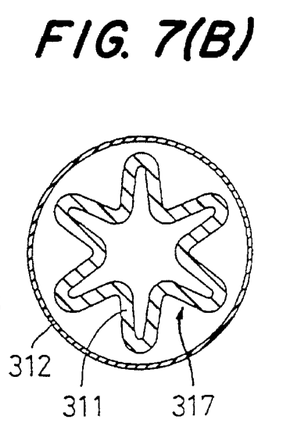

FIGS. 7(A) and 7(B) show another embodiment to increase the exhaust inflow filtration area of the filter element.

The particulate trap 325 shown in FIGS. 7(A) and 7(B) comprises a case 312 and a circumferentially corrugated cylindrical filter element 317 mounted in the case. The filter element is a three-dimensional mesh-like porous member 311 made of a heat-resistant metal having communicating pores 2. Closure members 318a, 318b are provided to close the gap defined between the outer surface of the cylindrical member and the inner surface of the case at one end of the case and to close the open end of the cylindrical member at the other end of the case.

FIGS. 8(A), 8(B) and 9(A), 9(B) show other embodiments to increase the exhaust inflow filtration area of the filter element.

The particulate traps of these embodiments comprise a case 412 or 512 and an axially corrugated cylindrical filter element 425 or 525 mounted in the case. The filter element is a three-dimensional mesh-like porous member 411 or 511 made of a heat-resistant metal having communicating pores 2. Closure members 418 or 518 are provided to close the gap defined between the outer surface the cylindrical member and the inner surface of the case at one end of the case and the open end of the cylindrical member at the other end of the case.

Further, the three-dimensional mesh-like porous member forming the filter element of the present invention is made of an Ni-based heat-resistant alloy having communicating pores. Preferably, the allow contains Ni: 60–85% by weight and Cr: 15–50% by weight. The present inventors have discovered that, by using a three-dimensional mesh-like porous member made of an Ni-based heat-resistant Ni-Cr alloy as the filter element, it can be regenerated repeatedly without the possibility of melting or cracking when burning and removing collected particulates. This is because, by the addition of Cr element, a stable Cr oxide film is formed when the atmospheric temperature rises to 800° C. or more by burning the collected particulates. If the content of Cr is less than 15% by weight, however, such a stable oxide film will not be formed. If more than 50%, an oxide film is not formed, either. Thus, the content of Cr should preferably be within the above-defined range.

Further, each filter element may be of a three-dimensional mesh-like porous member made of an Ni-based heat resistant metal having communicating pores, the porous member preferably containing Ni: 50–85% by weight, Cr: 10–50% by weight and Al: 1–6% by weight.

If the composition is out of this range, the heat resistance of the filter element will decrease to such a level that it cannot withstand repeated particulate collection and regeneration operations for a sufficiently long period of time. By adding Al together with Cr, the heat resistance improves more markedly than when adding only Cr. More specifically, by adding 1% or more Al, an oxide film is more stably formed in an oxidizing atmosphere. But if Al is added in an amount of more than 6%, a brittle intermetallic compound will be produced by the Ni and Al elements. This worsens the workability of the filter material. Especially if one tries to bend it, it will be easily broken. If 6% or less, the workability of the filter material is kept sufficiently high, so that it can be shaped into, e.g. a cylindrical filter element with no difficulty. An Al oxide film is highly resistant to the attack of sulfuric acid, which is contained in the exhaust. Thus, the filter element in the form of a three-dimensional mesh-like porous member made of an Ni-based heat-resistant Ni-Cr-Al alloy of the above-described composition shows especially high reliability for a long period of time in exhaust gas.

Figure 10:
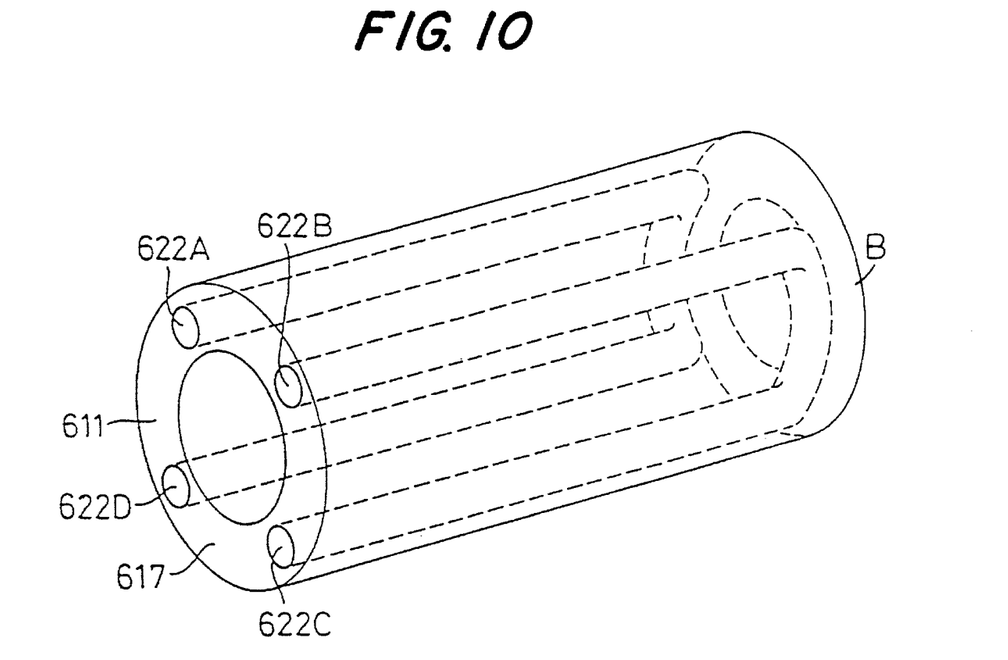
FIG. 10 is a perspective view of an embodiment of the particulate trap having a sheathed heater embedded in the filter element for burning and removing the collected particulates.

Further, the particulate trap according to the present invention may be provided with an electric heater or heaters as shown in FIG. 10. Such an electric heater may be provided on the front or rear end of the filter or on the inner or outer surface of a cylindrical filter. Further, it may be embedded in a cylindrical filter made of a porous metal. Its mounting position is determined taking into account the balance between the power consumption and the combustion efficiency.

The present inventors conducted the following tests.

Test 1

Figure 11:
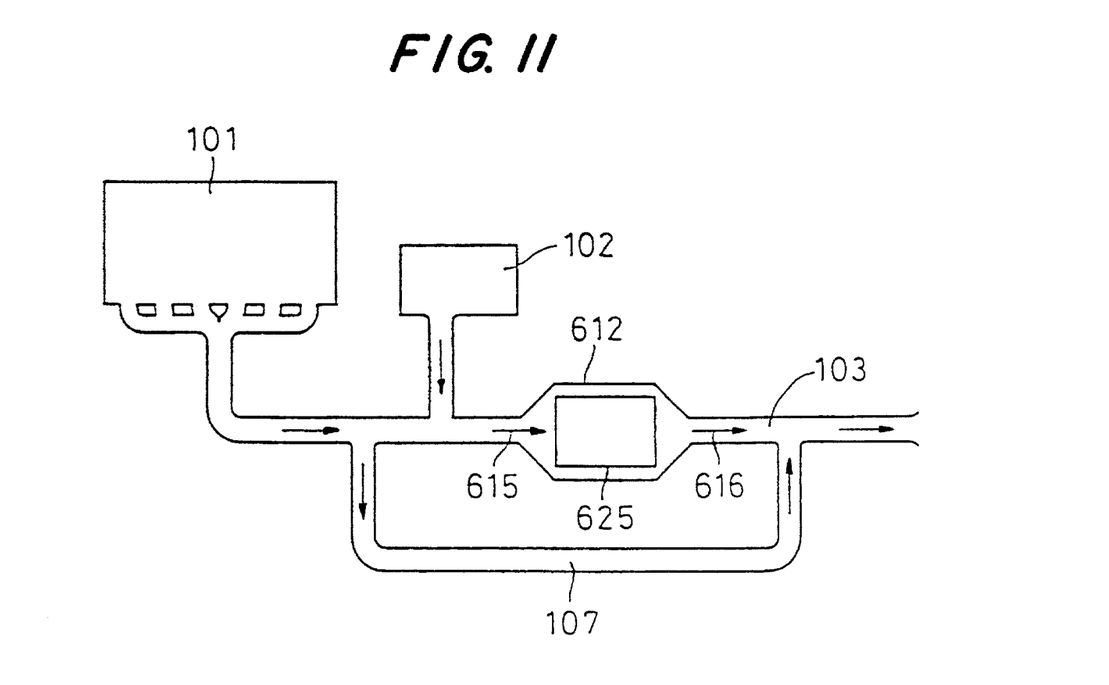
FIG. 11 is a schematic view of a trap and a regeneration gas feed device mounted in the exhaust line of a diesel engine.

As shown in FIG. 11, the trap according to the present invention and a regeneration gas feed device were mounted in the exhaust line of each of 6- and 4-liter six-cylinder direct-injection diesel engines. The trap used here was the particulate trap shown in FIGS. 5(A) and 5(B).

The regeneration gas feed device has a light oil burner which can produce hot air of 600°–900° C. By changing over the flow of exhaust so as to bypass the trap, the regeneration hot gas can be supplied to the trap. In FIG. 11, numeral 101 designates the engine; 125, the trap; 102, the regeneration gas feed device; 103, the exhaust pipe; and 107, the bypass. The particulate trap 125 for purifying the exhaust of a diesel engine used in this Test comprises a filter case 116 having an inlet 113 and outlet 114 for the exhaust of the diesel engine, and filter elements 117 mounted in the case.

The filter elements 117 in the form of three-dimensional mesh-like porous cylindrical members were mounted at uniform intervals in the filter element case 112 so as to extend longitudinally in the direction of the gas flow. Due to the closure members 118a, 118b exhaust gas flows through the wall to each cylindrical member 117. When the exhaust gas passes through the walls of the filter elements, the particulates contained in the exhaust are collected. The exhaust thus purified is discharged from the trap.

The filter element was constructed from a three-dimensional mesh-like porous member made of a head-resistant metal (e.g. a porous metal "Celmet" made by Sumitomo Electric Industries Ltd.). In particular, the three-dimensional mesh-like porous member was made of a Ni-Cr alloy comprising Ni: 65% by weight and Cr: 35% by weight. It was formed by Ni-electroplating a conductivity-treated foamed urethane resin having three-dimensional communicating pores, burning it to remove the resin component and yield an Ni-based material, and alloying the material by chromizing treatment. This metal sheet having a three-dimensional mesh-like porous structure was wound spirally to form a cylindrical filter element as shown in FIG. 2. One to seven elements were mounted in a trap case.

In order to examine how much the exhaust from a diesel engine can be cleaned with the trap according to the present invention, we prepared filters having various different structures. All of the filter elements had a thickness of 10 mm. By changing the number of turns and the degree of compression when forming the filter elements, the volume ratio of the porous metal in the direction of thickness of the filter elements was varied within the range of 5–45%. The numbers of pores in the direction of thickness were also varied.

Tables 1–3 show the structures of the filter elements used in the experiments. Table 4–6 show the structure of comparative examples. Table 7 shows the properties of the examples. Table 8 shows the properties of the comparative examples. Both in the examples and the comparative examples, we used three-dimensional mesh-like porous members made of a Ni-Cr alloy having a surface roughness Rmax of 0.2 μm or more and made by Sumitomo Electric Industries Ltd.

Without a trap, the amount of particulates discharged was 0.54 g/HP.Hr. In contrast, in the examples 1 to 14, the particulate emission rates were 0.1 g/HP.Hr or less after 20 cycles. Moreover, it was found out that the average particulate collection rate over 20 cycles was 60% or higher, which meets the 1994 EPA emission standard in the United States.

Comparative examples 29, 34, 36 and 41 showed such high particulate collection rates as to clear the EPA emission standard because their pores had a rather small average diameter of 0.08 mm. However because of the small pores, the back pressure increased so high as to adversely influence the engine. Although comparative examples 22, 27, 29, 34, 36 and 41 showed sufficiently low particulate emission after 20 cycles, the pressure drop was too high to be acceptable.

Upon completion of a 20-cycle operation, the engine exhaust was directed into a bypass to feed hot air heated to an average of 700° C. into the trap from the regeneration hot gas feed device for about 15 minutes at the feed rate of 2 m³/min. The collected particulates were burned by the hot air and the filter was regenerated. After regeneration of the filter, the pressure drop decreased sharply to approximately the initial pressure, i.e. 1–2 KPa. This clearly shows that the collected particulates had been burned and removed and thus the exhaust filter had been regenerated almost thoroughly. After regeneration, the particulate filter suffered no melting, cracks or extreme oxidation or corrosion. Exhaust gas was introduced again into the filter thus regenerated. After 20 cycles, the exhaust circuit was changed over again to regenerate the filter by feeding hot gas to it.

This collection/regeneration test was further kept up until regeneration was repeated 300 times. Even at this point, no significant increase or change in pressure drop was observed with the trap of the present invention. Also, even when the regeneration conditions were not controlled strictly, the filter never damaged. Moreover, even became after the filter had been subjected to regeneration 300 times, the pressure drop immediately after regeneration was kept at substantially the initial pressure, i.e. 1–2 KPa. After the filter had been regenerated 100 times, neither external damage such as melting and cracks nor mechanical deterioration was observed.

Also, the temperatures at a plurality of points of the filter element were measured during regeneration. The maximum temperature reached 850° C. but the temperature dropped within three minutes at the longest. This means that the collected particles had been burned off in three minutes.

The filter elements used in the above experiments had such a construction that the exhaust flowed from the outside to inside of the filter elements through their wall. However even with traps which differ from the traps used in the above experiments only in that the exhaust is adapted to flow from the inside to outside of the filter elements, the particulates in the exhaust were collected at the rate of 60% or more and the concentration of particulates in the exhaust was 0.08 g/HP.Hr or less, which meets the emission standard. Also, after regenerated 300 times, the filter elements suffered no damage and the amount of particulates in the exhaust was within the EPA standard.

In the Test 1, one to seven cylindrical filter elements were mounted in a filter element case. Instead, the particulate trap 225 having the filter 217 shown in FIGS. 6(A), 6(B) may be used. The filter 217 comprises a plurality of cylindrical filter elements 217a, 217b and 217c having different diameters from one another and formed by winding a three-dimensional mesh-like porous member 10 made of a heat-resistant metal having communicating pores. With this arrangement, it is possible to increase the gas inflow filtration area per liter of the engine displacement compared with the traps used in Test 1 provided the cases used are of the same size.

Further, the embodiment of FIGS. 6(A), 6(B), may be mounted in the opposite way with the portion 213 located on the exhaust outlet side and the portion 214 on the inlet side. In this arrangement, the exhaust flows from inside to outside of the filter elements. The particulate collection rate decreased about 10% in this case but was still sufficiently high.

Test 2

Projected Width of the Section of the Porous Structure

We examined the relation between the projected width of the section of the metal skeleton forming the three-dimensional mesh-like porous member and the characteristics of the filter. In the test, we used the trap having the filter elements shown in FIGS. 5(A), 5(B) and mounted in the exhaust line of a 2.8-liter swirl-chamber diesel engine. The sections of the metal skeleton in the examples and the comparative examples had different projected widths. After driving the engine for three hours at 1800 rpm and 5 kgf.m, the amount of the collected particulates and the pressure drop were measured. The section of the metal skeleton forming the three-dimensional mesh-like porous member had a projected width of 17–250 μm, though this figure changes according to the average diameter and the number of pores. Table 9 shows the structures of the particulate traps of the examples and the comparative examples used in this Test.

Table 10 shows the results of Test 2. It was confirmed that the three-dimensional mesh-like porous members of the example can collect sufficient amounts of particulates without unduly increasing the pressure drop, provided that the pores in the porous member have a diameter of 0.1–1.0 mm, that the average number of pores as counted in the thickness direction of the filter element is 10 or more, that the volume packing density of the porous member in the entire filtering space is 10–40%, that the exhaust inflow filtration area of the filter is 400 cm$^2$ or more, and that the projected width of section of the metal skeleton to be formed is 20 μm or more. If any of the above conditions is not met, the particulate collection capacity was not high enough and the pressure drop was not low enough.

Test 3

Surface Roughness

We examined the relation between the surface condition of the three-dimensional mesh-like porous member and the filtering properties.

The test was conducted by mounting the trap in the exhaust line of a 2.8-liter diesel engine. The engine was driven for three hours at 1800 rpm with the torque of 6 kgf.m to collect particulates.

In the test, we used a trap having concentrically arranged filter elements shown in FIGS. 6(A), 6(B).

The filter elements used in the experiments were formed by rolling a sheet of the three-dimensional mesh-like porous material with a predetermined radius of curvature. The sizes of the filter elements were determined taking into account the gas inflow area of the filter elements as shown in Test 1. More specifically, a continuous sheet was formed from a three-dimensional mesh-like porous member having an average pore diameter of 0.5 mm. This sheet was formed into a cylindrical member having an outer diameter of 140 mm and a thickness of 10 mm, a cylindrical member having an outer diameter of 110 mm and a thickness of 10 mm, and a cylindrical member having an outer diameter of 80 mm and a thickness of 10 mm. The volume packing density of the metal skeleton to the entire filter space was 12.5%. The effective length of the filter elements was 150 mm. Closure members and presser members were used to secure and close the ends of the filter elements so that exhaust may flow as shown in FIG. 6(A).

The heat-resistant porous member used in the experiment was a porous Ni-Cr alloy formed by chromizing an Ni-based three-dimensional mesh-like porous member made by Sumitomo Electric Industries.

In the chromizing treatment, chromium chloride gas is produced from the powder. Thus, by controlling the gas producing amount or the speed with which it deposits onto the metal skeleton, the surface condition of the Ni-Cr alloyed metal porous member can be changed freely as in a typical CVD process. Such a powder-alloying technique is also used when forming an Ni-Cr-Al alloyed metal porous member. It is well-known that a smooth surface can be obtained if the material gas is produced at a slow rate and deposited on the surface of Ni-based porous member and that if the material gas is produced at high speed, a rough surface results. Even if the surface is rough immediately after deposition, it will be smoothed gradually by leaving the porous member at a high temperature of 1000° C. or more in a reducing atmosphere because in such an atmosphere, the deposited elements disperse into the metal skeleton.

In this Test, we examined the properties of various filters formed under different deposition/dispersion conditions so that they have different degrees of surface roughness. For the purpose of comparison, we also prepared porous filters as comparative examples. They were subjected to dispersion treatment at 1050° C. for 20 hours, which is longer than five times the normal time for such treatment, to obtain a smooth surface having an Rmax value of 0.1 μm or less.

Table 11 shows the particulate collection amounts of these filter elements as a function of time. As shown in Table 11, in the initial stage, the filters having rougher surfaces can collect particulates with higher efficiency than those having smoother surfaces. It is clear from this fact that there is a close correlation between the surface roughness of the filter and its particulate collection capacity, especially in the initial stage of particulate collection. We found that the filter can collect particulates at a sufficiently high rate if it has a surface roughness of 0.2 μm or higher in Rmax. The shape of the filter of the present invention is not limited only if its surface roughness is 0.2 μm or more in Rmax. Also, it may be made of Ni-Cr-Al alloyed metallic porous material, which is formed by powder-alloying as with an Ni-Cr alloyed metallic porous material or any other material.

Test 4

Corrugated Filter

The embodiment of the trap of FIGS. 7(A), 7(B) was used in this Test.

Examples

We prepared the circumferentially corrugated cylindrical filter element by press-forming a sheet cut to a predetermined size and made of a three-dimensional mesh-like porous metal containing 40% by weight of Cr. The element had a constant thickness of 10 mm. In order to make the thickness constant, it was formed by laminating corrugated sheets of different sizes, bonding them together and reforming the shape. The case had an inner diameter of 160 mm. The filter element was 350 mm long.

In examples shown in Table 12, the three-dimensional mesh-like porous members had pores having diameters of 0.1, 0.5 and 1.0 mm. Their thicknesses were adjusted so that the volume packing densities will be within the range of 10–40%. The number of pores was counted in the thickness direction at three points.

The corrugated cylindrical filter element 317 thus formed was mounted in the filter element case 312. Closure members were provided to close one end of the gap defined between the outer surface of the cylindrical member 317 and the inner surface of the case 312 and the opening of the cylindrical member at the other end.

Comparative Examples

As comparative examples, we prepared a particulate trap comprising the same case as used in the examples and a corrugated filter element which is of the same type as that of the examples but has fewer, i.e. four corrugations, and a trap having a cylindrical uncorrugated filter element. Both filter elements have their ends closed. Specific structures of the comparative examples as well as the examples are shown in Table 12.

The test was conducted by mounting the respective traps in the exhaust line of a 2.8-liter diesel engine. The engine was driven for six hours at 1600 rpm with the torque of 6 kgf.m to collect particulates. The particulate collection capacity and the pressure drop were measured for each of the examples and the comparative examples.

As shown in Table 13, the particulate traps of the examples could collect substantially the same amount of particulates in a predetermined period of time, while keeping the pressure drop lower than the comparative examples by 15–20%.

From the results of Test 4, it was found out that by using a trap having a corrugated filter element, the pressure drop can be kept low compared with a trap having a completely cylindrical filter element of the same diameter, provided the cases have the same exhaust inflow filtration area and the filter elements have the same particulate collection capacity.

As shown in FIG. 7(A), exhaust gas introduced into the filter elements used in the test flows from the outside of the filter element to its inside. However particulates can be collected with sufficiently high efficiency even if the end faces are closed in the opposite way so that the exhaust flows from inside to outside. It was confirmed in a separate test that the collection efficiency of such a trap decreases only about 10% provided it is of the same size.

Test 5

Figure 8A:
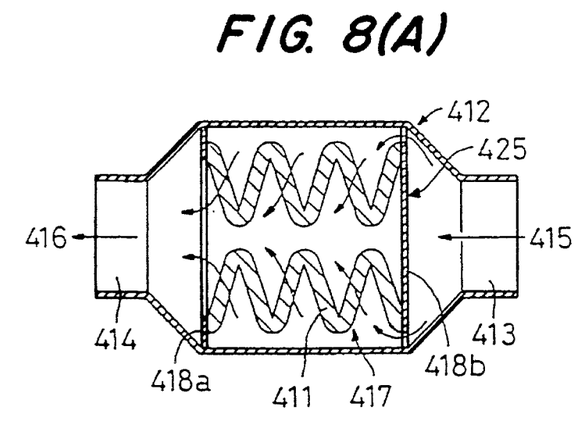
Figure 8B:
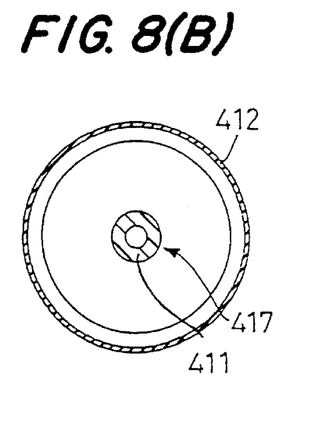
Figure 9A:
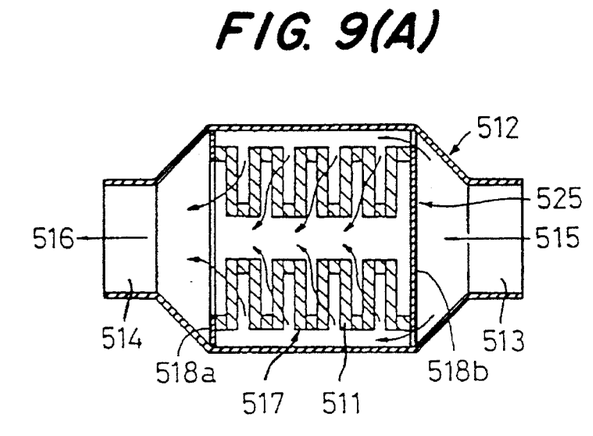
Figure 9B:
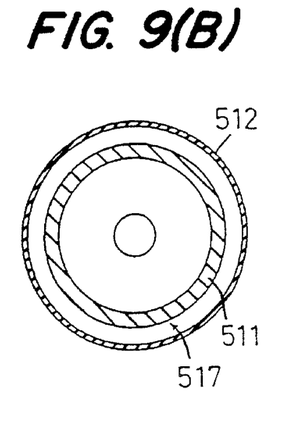

The embodiment of the trap shown in FIGS. 8(A), 8(B) was used for this Test. The filter element was a three-dimensional mesh-like porous member 411 made of a heat-resistant Ni-Cr alloy metal having communicating pores.
Examples The present inventors prepared axially corrugated cylindrical filter elements by press-forming a sheet having a predetermined size and made of a three-dimensional mesh-like porous metal containing 40% by weight of Cr. The elements had a constant thickness of 10 mm. In order to make the thickness constant, they were formed by laminating corrugated sheets of different sizes, bonding them together and reforming the shape. The cases had an inner diameter of 160 mm as with the cases used in Test 4. The filter elements were 350 mm long. The filter elements had three, four and seven axial corrugations, respectively, and had different gas inflow filtration areas. Their performance was evaluated.
Comparative Examples For comparison purposes, the inventors prepared particulate traps having completely cylindrical uncorrugated filter elements. The size of the cases and the length and thickness of the filter elements were the same as those of the examples.

Specific structures of the comparative examples as well as the examples are shown in Table 14.

The test was conducted by mounting the respective traps in the exhaust line of a 2.8-liter diesel engine. The engine was driven for six hours at 1600 rpm with the torque of 6 kgf.m to collect particulates. The particulate collection capacity and the pressure drop were measured for each of the examples and the comparative examples.

Table 15 shows the results of the test.

It was found out that an axially corrugated filter element could lower the pressure drop, although the particulate collection capacity is substantially unchanged. This is because the gas inlet filtration area of the filter element forming the particulate trap increases by corrugating it.

As shown in FIG. 8(A), exhaust gas introduced into the filter elements used in this Test flows from the outside of the filter element to its inside. However particulates can be collected with sufficiently high efficiency even if the end faces are closed in the opposite way so that the exhaust flows in the opposite way.

Test 6

The filter used in Test 1 was a three-dimensional mesh-like porous member made of an Ni-Cr alloy. But the composition of such an Ni-Cr alloy is not limited to the one shown in Test 1. The inventors prepared filters made of Ni-Cr alloys having different compositions. They also prepared three-dimensional mesh-like porous filter elements made of Ni-Cr-Al alloys. The filters were regenerated by burning the collected particulates with hot air heated to an average temperature of 800° C. by a burner and fed from the regeneration hot gas feed device at the feed rate of 2 m³/min.

Table 16 shows the test results of the examples and the comparative examples. As shown in Table 16, the three-dimensional mesh-like porous members made of Ni-Cr alloys having the compositions shown in the table and the three-dimensional mesh-like porous members made of Ni-Cr-Al alloys having the compositions shown in the table never suffered damage even after they had been regenerated 500 times, and thus showed sufficient durability.

Specifically, the filters made of Ni-Cr alloys containing 15% by weight or more Cr were durable enough not to develop any large amount of damage even after they had been regenerated 500 times. The filters containing 10% by weight or less Cr was brittle and developed porous oxide scales. Thus, they were not durable enough. It was also found out that the addition of Al cannot significantly improve the heat resistance of the filters.

Test 7

Heater

In Test 1, as one example of the method for removing the particulates collected by the filter element, the heat produced by the burner without any strict heat control was used to burn the particulates collected. In this Test, the particulates collected by the porous member were burned and removed with an electric heater.

The mounting position of the heater element is important in this case. As an example, as shown in FIG. 10, the inventors used a cylindrical filter element having sheathed heaters made of a three-dimensional mesh-like porous material. The sheathed heaters are embedded in the wall of the filter element for collecting particulates when exhaust gas flows therethrough. In FIG. 10, the sheathed heaters 622A–622D are embedded in the cylindrical member 617. They are disposed as near to the gas inlet as possible. The sheathed heaters 622A and 622B are each a one-piece member which is bent near the end face B. The bent portion is embedded in the end face B. The heaters 622C and 622D have the same structure as the heaters 622A and 622B. A heaters 622A–622D are arranged at the pitch of 90°.

Four such filter elements with heaters were mounted in the trap shown in FIGS. 5(A), 5(B) with their end faces closed. In this Test, the filter elements were mounted in the trap such that the exhaust flows from the inside to the outside of each filter element. Each filter element had an outer diameter of 150 mm, a thickness of 10 mm was 350 mm long. The filter elements were three-dimensional mesh-like porous members made of an Ni-Cr alloy and having pores having an average diameter of 0.5 mm. The number of pores as counted in the thickness direction was 35 and their volume packing density to the entire filtering space was 20%. This trap was mounted in the discharge line of a 2.0-liter diesel engine and the engine was driven at 2000 rpm with a torque of 5 kgf.m. The initial pressure drop was 1 KPa. As the engine was driven, the amount of particulates collected and thus the pressure drop increased gradually. When the engine was driven five hours, the pressure drop increased to 6 KPa. It is necessary to burn and remove the particulates discharged from the diesel engine by activating the electric heaters before the back pressure unduly increases. In this Test, the heaters were activated by connecting the ends 622A and 622B to the (+) terminal of a power source and the ends 622C and 622D to the (−) terminal. As the heaters were operated, the pressure drop of the trap decreased sharply to the initial level of 1–2 KPa. This clearly shows that the collected particulates had been burned and removed and the filters had been regenerated properly.

The collected particulates are heated by the heaters, which are provided near the exhaust inflow side, together with the metallic three-dimensional mesh-like porous members, so that the particulates quickly ignite and burn off. The filters are thus regenerated quickly.

Observation of the filters thus regenerated revealed nothing abnormal. This shows that, with this arrangement, the filter material is kept free of undue loads.

The three-dimensional mesh-like material used in the present invention is a porous metal and thus has a small heat capacity and exhibits low heat conductivity compared with cordierite filters. Thus, the heat produced in the area where the soot is burned is discharged quickly together with a large amount of exhaust gas. Thus, the filters are less likely to be overheated locally. Since the filters are heated only in the limited area where the particulates are burned, no sharp burning or thermal shock due to cooling occurs. Rather, the filters can be heated at a moderate rate.

In this Test, the heaters are embedded in the cylindrical member near its inner surface at the gas inlet side. But if the exhaust gas is to be introduced from outside to inside of the cylindrical member, the heaters should preferably be embedded near the outer surface of the cylindrical member in view of heat efficiency.

In this Test, four filter elements were mounted in the trap as shown in FIG. 5(B). Of course, the number of filter elements may be varied according to the engine displacement and the structure of the regeneration system.

According to the present invention, there is provided a particulate trap for purifying diesel engine exhaust which can collect the particulates in the exhaust with high efficiency while not unduly increasing the pressure drop and which can sufficiently withstand thermal stresses during the regeneration treatment.

TABLE 1

Structure of particulate traps of the present invention used in Test 1

| | Example | | | | | | |
|---|---|---|---|---|---|---|---|
| | 1 | 2 | 3 | 4 | 5 | 6 | 7 |
| Size of cylindrical member | | | | | | | |
| Outer diameter (mm) | 250 | 250 | 250 | 250 | 250 | 250 | 250 |
| Inner diameter (mm) | 230 | 230 | 230 | 230 | 230 | 230 | 230 |
| Length (mm) | 300 | 300 | 300 | 300 | 460 | 460 | 460 |
| Number | 1 | 1 | 1 | 1 | 1 | 1 | 1 |
| Average pore diameter (mm) | 0.1 | 0.5 | 1.0 | 0.5 | 0.1 | 0.5 | 1.0 |
| Average numbers of pores in direction of thickness | 120 | 27 | 12 | 50 | 145 | 35 | 21 |
| Volume packing density (%) | 10 | 12 | 10 | 40 | 10 | 20 | 25 |
| Gas inflow filtration area per liter of exhaust (cm$^2$) | 400 | 400 | 400 | 400 | 600 | 600 | 600 |

TABLE 2

Structure of particulate traps of the present invention used in Test 1

| | Example | | | | | | |
|---|---|---|---|---|---|---|---|
| | 8 | 9 | 10 | 11 | 12 | 13 | 14 |
| Size of cylindrical member | | | | | | | |
| Outer diameter (mm) | 100 | 100 | 100 | 100 | 100 | 100 | 100 |
| Inner diameter (mm) | 80 | 80 | 80 | 80 | 80 | 80 | 80 |
| Length (mm) | 190 | 190 | 190 | 190 | 290 | 290 | 290 |
| Number | 4 | 4 | 4 | 4 | 4 | 4 | 4 |
| Average pore diameter (mm) | 0.1 | 0.5 | 1.0 | 0.5 | 0.1 | 0.5 | 1.0 |
| Average number of pores in direction of thickness | 120 | 27 | 12 | 50 | 145 | 35 | 21 |
| Volume packing density (%) | 10 | 12 | 10 | 40 | 10 | 20 | 25 |

TABLE 2-continued

Structure of particulate traps of the present invention used in Test 1

| | Example | | | | | | |
|---|---|---|---|---|---|---|---|
| | 8 | 9 | 10 | 11 | 12 | 13 | 14 |
| Gas inflow filtration area per liter of exhaust (cm²) | 400 | 400 | 400 | 400 | 600 | 600 | 600 |

TABLE 3

Structure of particulate traps of the present invention used in Test 1

| | Example | | | | | | |
|---|---|---|---|---|---|---|---|
| | 15 | 16 | 17 | 18 | 19 | 20 | 21 |
| Size of cylindrical member | | | | | | | |
| Outer diameter (mm) | 80 | 80 | 80 | 80 | 80 | 80 | 80 |
| Inner diameter (mm) | 60 | 60 | 60 | 60 | 60 | 60 | 60 |
| Length (mm) | 140 | 140 | 140 | 140 | 200 | 200 | 200 |
| Number | 7 | 7 | 7 | 7 | 7 | 7 | 7 |
| Average pore diameter (mm) | 0.1 | 0.5 | 1.0 | 0.5 | 0.1 | 0.5 | 1.0 |
| Average number of pores in direction of thickness | 120 | 27 | 12 | 50 | 145 | 35 | 21 |
| Volume packing density (%) | 10 | 12 | 10 | 40 | 10 | 20 | 25 |
| Gas inflow filtration area per liter of exhaust (cm²) | 400 | 400 | 400 | 400 | 600 | 600 | 600 |

TABLE 4

Structure of particulate traps of the present invention used in Test 1

| | Example | | | | | | |
|---|---|---|---|---|---|---|---|
| | 22 | 23 | 24 | 25 | 26 | 27 | 28 |
| Size of cylindrical member | | | | | | | |
| Outer diameter (mm) | 250 | 250 | 250 | 250 | 250 | 250 | 250 |
| Inner diameter (mm) | 230 | 230 | 240 | 220 | 230 | 240 | 230 |
| Length (mm) | 270 | 270 | 270 | 350 | 350 | 460 | 460 |
| Number | 1 | 1 | 1 | 1 | 1 | 1 | 1 |
| Average pore diameter (mm) | 0.08 | 1.2 | 1.2 | 1.2 | 0.5 | 0.08 | 1.2 |
| Average number of pores in direction of thickness | 140 | 25 | 9 | 20 | 56 | 70 | 23 |
| Volume packing density (%) | 10 | 40 | 5 | 12 | 45 | 8 | 42 |
| Gas inflow filtration area per liter of exhaust (cm²) | 350 | 350 | 350 | 450 | 450 | 600 | 600 |

TABLE 5

Structure of particulate traps of the comparative examples used in Test 1

| | Comparative example | | | | | | |
|---|---|---|---|---|---|---|---|
| | 29 | 30 | 31 | 32 | 33 | 34 | 35 |
| Size of cylindrical member | | | | | | | |
| Outer diameter (mm) | 100 | 100 | 100 | 100 | 100 | 100 | 100 |
| Inner diameter (mm) | 80 | 80 | 80 | 80 | 80 | 90 | 80 |

TABLE 5-continued

Structure of particulate traps of the comparative examples used in Test 1

| | Comparative example | | | | | | |
|---|---|---|---|---|---|---|---|
| | 29 | 30 | 31 | 32 | 33 | 34 | 35 |
| Length (mm) | 170 | 170 | 170 | 190 | 290 | 290 | 290 |
| Number | 4 | 4 | 4 | 4 | 4 | 4 | 4 |
| Average pore diameter (mm) | 0.08 | 1.2 | 0.5 | 1.2 | 0.5 | 0.08 | 1.2 |
| Average number of pores in direction of thickness | 140 | 25 | 23 | 20 | 56 | 70 | 22 |
| Volume packing density (%) | 10 | 45 | 6 | 22 | 45 | 8 | 42 |
| Gas inflow filtration area per liter of exhaust (cm$^2$) | 350 | 350 | 350 | 400 | 600 | 600 | 600 |

TABLE 6

Structure of particulate traps of the comparative examples used in Test 1

| | Comparative example | | | | | | |
|---|---|---|---|---|---|---|---|
| | 36 | 37 | 38 | 39 | 40 | 41 | 42 |
| Size of cylindrical member | | | | | | | |
| Outer diameter (mm) | 80 | 80 | 80 | 80 | 80 | 80 | 80 |
| Inner diameter (mm) | 60 | 60 | 70 | 60 | 60 | 70 | 60 |
| Length (mm) | 120 | 120 | 120 | 140 | 140 | 205 | 205 |
| Number | 7 | 7 | 7 | 7 | 7 | 7 | 7 |
| Average pore diameter (mm) | 0.08 | 1.2 | 0.5 | 1.2 | 0.5 | 0.08 | 1.2 |
| Average number of pores in direction of thickness | 140 | 25 | 23 | 20 | 56 | 70 | 22 |
| Volume packing density (%) | 10 | 45 | 6 | 22 | 45 | 8 | 42 |
| Gas inflow filtration area per liter of exhaust (cm$^2$) | 350 | 350 | 350 | 400 | 400 | 600 | 600 |

TABLE 7

Evaluation result of the examples in Test 1

| | Initial | After 20 cycles of collections | | After regenerating after 20 collections | After 100 collections & regenerating repeated | | After 300 collections & regenerating repeated | |
|---|---|---|---|---|---|---|---|---|
| | | | | | After collecting | After regenerating | After collecting | After regenerating |
| | Pressure drop (KPa) | Collection efficiency (%) | Pressure drop (KPa) | Pressure drop (KPa) | Pressure drop (KPa) | Pressure drop (KPa) | Pressure drop (KPa) | Pressure drop (KPa) |
| Example 1 | 1.7 | 85 | 28 | 1.7 | 28 | 1.8 | 28 | 1.0 |
| Example 2 | 1.4 | 70 | 22 | 1.3 | 22 | 1.2 | 22 | 1.2 |
| Example 3 | 1.0 | 69 | 14 | 1.0 | 15 | 1.0 | 15 | 1.0 |
| Example 4 | 1.3 | 75 | 25 | 1.3 | 26 | 1.4 | 26 | 1.4 |
| Example 5 | 1.5 | 85 | 27 | 1.5 | 27 | 1.5 | 27 | 1.5 |
| Example 6 | 1.0 | 70 | 20 | 1.0 | 20 | 1.0 | 20 | 1.0 |
| Example 7 | 1.1 | 63 | 18 | 1.1 | 20 | 1.1 | 20 | 1.1 |
| Example 8 | 1.8 | 85 | 28 | 1.7 | 28 | 1.8 | 28 | 1.8 |
| Example 9 | 1.4 | 72 | 21 | 1.4 | 21 | 1.4 | 21 | 1.4 |
| Example 10 | 1.0 | 61 | 15 | 1.0 | 15 | 1.0 | 15 | 1.0 |
| Example 11 | 1.6 | 78 | 25 | 1.6 | 28 | 1.6 | 28 | 1.6 |
| Example 12 | 1.9 | 83 | 26 | 2.0 | 27 | 2.0 | 27 | 2.0 |
| Example 13 | 1.3 | 65 | 27 | 1.4 | 25 | 1.4 | 25 | 1.4 |
| Example 14 | 1.0 | 65 | 18 | 1.0 | 18 | 1.0 | 18 | 1.0 |
| Example 15 | 1.8 | 87 | 28 | 1.8 | 28 | 1.8 | 28 | 1.8 |
| Example 16 | 1.5 | 76 | 25 | 1.5 | 25 | 1.5 | 25 | 1.5 |
| Example 17 | 1.0 | 62 | 20 | 1.0 | 20 | 1.0 | 20 | 1.0 |

TABLE 7-continued

Evaluation result of the examples in Test 1

|  | Initial | After 20 cycles of collections | | After re-generating after 20 collect-ions | After 100 collections & regenerating repeated | | After 300 collections & regenerating repeated | |
|---|---|---|---|---|---|---|---|---|
|  |  |  |  |  | After collecting | After regenerating | After collecting | After regenerating |
|  | Pressure drop (KPa) | Collection efficiency (%) | Pressure drop (KPa) | Pressure drop (KPa) | Pressure drop (KPa) | Pressure drop (KPa) | Pressure drop (KPa) | Pressure drop (KPa) |
| Example 18 | 2.0 | 85 | 29 | 2.0 | 28 | 2.0 | 28 | 2.0 |
| Example 19 | 1.8 | 80 | 26 | 1.8 | 26 | 1.8 | 26 | 1.8 |
| Example 20 | 1.7 | 81 | 27 | 1.8 | 27 | 1.7 | 27 | 1.7 |
| Example 21 | 1.2 | 70 | 20 | 1.2 | 20 | 1.2 | 20 | 1.2 |

TABLE 8

Evaluation result of the comparative examples in Test 1

|  | Initial | After 20 cycles of collections | | After re-generating after 20 collect-ions | After 100 collections & regenerating repeated | | After 300 collections & regenerating repeated | |
|---|---|---|---|---|---|---|---|---|
|  |  |  |  |  | After collecting | After regenerating | After collecting | After regenerating |
|  | Pressure drop (KPa) | Collection efficiency (%) | Pressure drop (KPa) | Pressure drop (KPa) | Pressure drop (KPa) | Pressure drop (KPa) | Pressure drop (KPa) | Pressure drop (KPa) |
| Comparative example 22 | 2.0 | 75 | 45 | 2.0 | 47 | 2.0 | 47 | 2.0 |
| 23 | 1.6 | 53 | 32 | 1.6 | 34 | 1.6 | 34 | 1.6 |
| 24 | 1.3 | 40 | 25 | 1.3 | 27 | 1.3 | 27 | 1.3 |
| 25 | 1.4 | 50 | 25 | 1.4 | 25 | 1.4 | 25 | 1.4 |
| 26 | 2.0 | 65 | 42 | 2.0 | 26 | 2.0 | 26 | 2.0 |
| 27 | 1.9 | 70 | 37 | 1.9 | 38 | 1.9 | 38 | 1.9 |
| 28 | 1.6 | 55 | 28 | 1.6 | 28 | 1.6 | 28 | 1.6 |
| 29 | 2.1 | 73 | 46 | 2.1 | 45 | 2.1 | 45 | 2.1 |
| 30 | 1.6 | 50 | 28 | 1.7 | 28 | 1.6 | 28 | 1.6 |
| 31 | 1.2 | 45 | 28 | 1.3 | 28 | 1.2 | 28 | 1.2 |
| 32 | 1.2 | 55 | 28 | 1.3 | 29 | 1.2 | 29 | 1.2 |
| 33 | 2.2 | 65 | 46 | 2.2 | 48 | 2.2 | 48 | 2.2 |
| 34 | 2.0 | 70 | 39 | 2.0 | 38 | 2.0 | 38 | 2.0 |
| 35 | 1.4 | 53 | 26 | 1.4 | 27 | 1.4 | 27 | 1.4 |
| 36 | 2.1 | 76 | 48 | 2.2 | 45 | 2.1 | 45 | 2.1 |
| 37 | 1.6 | 52 | 30 | 1.7 | 31 | 1.6 | 31 | 1.6 |
| 38 | 1.2 | 45 | 28 | 1.2 | 28 | 1.2 | 28 | 1.2 |
| 39 | 1.2 | 40 | 24 | 1.3 | 24 | 1.2 | 24 | 1.2 |
| 40 | 2.2 | 67 | 48 | 2.3 | 47 | 2.2 | 47 | 2.2 |
| 41 | 2.0 | 70 | 38 | 2.0 | 38 | 2.0 | 38 | 2.0 |
| 42 | 1.5 | 52 | 28 | 1.5 | 28 | 1.5 | 28 | 1.5 |

TABLE 9

Structure of particulate traps used in Test 2
(Projected width of skeleton section)

|  | Example | | | | Comparative example | | |
|---|---|---|---|---|---|---|---|
|  | 43 | 44 | 45 | 46 | 47 | 48 | 49 |
| Size of cylindrical member |  |  |  |  |  |  |  |
| Outer diameter (mm) | 140 | 70 | 70 | 70 | 70 | 70 | 70 |

TABLE 9-continued

Structure of particulate traps used in Test 2
(Projected width of skeleton section)

|  | Example | | | | Comparative example | | |
| --- | --- | --- | --- | --- | --- | --- | --- |
|  | 43 | 44 | 45 | 46 | 47 | 48 | 49 |
| Inner diameter (mm) | 120 | 50 | 50 | 50 | 50 | 50 | 50 |
| Length (mm) | 350 | 325 | 325 | 325 | 325 | 325 | 150 |
| Number of cylindrical member | 1 | 4 | 4 | 4 | 4 | 4 | 4 |
| Average pore diameter (mm) | 1.0 | 0.5 | 0.5 | 0.1 | 0.08 | 1.2 | 0.08 |
| Projected width of framework (μm) | 200 | 100 | 60 | 20 | 17 | 250 | 17 |
| Average numbers of pores in direction of thickness | 17 | 28 | 27 | 125 | 140 | 18 | 200 |
| Volume packing density (%) | 25 | 25 | 25 | 10 | 10 | 30 | 25 |
| Gas inflow filtration area per liter of exhaust (cm$^2$) | 600 | 600 | 600 | 600 | 600 | 600 | 400 |

TABLE 10

Evaluation result in Test 2

| No. | Amount of particulate collected (g) and pressure drop (KPa) | | | | | | | |
| --- | --- | --- | --- | --- | --- | --- | --- | --- |
|  | Before collecting | | 20 minutes later | | 1 hour later | | 3 hours later | |
| Example 43 | 0 | 0.4 | 0.25 | 0.6 | 1.2 | 1.0 | 4.0 | 3.8 |
| Example 44 | 0 | 0.5 | 0.40 | 0.9 | 2.0 | 2.0 | 5.2 | 5.5 |
| Example 45 | 0 | 0.5 | 0.35 | 0.8 | 1.6 | 1.8 | 6.0 | 5.6 |
| Example 46 | 0 | 0.6 | 0.5 | 1.2 | 2.1 | 2.1 | 5.9 | 5.7 |
| Comparative example 47 | 0 | 0.5 | 0.5 | 1.1 | 2.2 | 2.9 | 6.2 | 8.0 |
| Comparative example 48 | 0 | 0.5 | 0.2 | 0.9 | 0.8 | 1.8 | 2.2 | 3.5 |
| Comparative example 49 | 0 | 0.7 | 0.6 | 1.5 | 2.2 | 3.0 | 6.0 | 15.2 |

TABLE 11

Evaluation result of skeleton surface and collection performance of three-dimensional porous members in Test 3

| No. |  | Amount of particulate collected (g) and pressure drop (KPa) | | | | | | | |
| --- | --- | --- | --- | --- | --- | --- | --- | --- | --- |
|  |  | Before collecting | | 20 minutes later | | 60 minutes later | | 3 hours later | |
| Comparative example 50 | 0.1 μm< | 0 | 0.5 | 0.25 | 0.5 | 0.6 | 1.0 | 2.0 | 1.8 |
| Example 51 | 0.2 μm | 0 | 0.5 | 0.5 | 1.1 | 1.2 | 1.8 | 3.5 | 2.5 |
| Example 52 | 0.5 μm | 0 | 0.5 | 0.6 | 1.2 | 1.2 | 1.9 | 3.6 | 2.6 |
| Example 53 | 1.0 μm | 0 | 0.5 | 0.7 | 1.3 | 1.3 | 2.1 | 3.7 | 2.7 |

TABLE 12

Structure of particulate traps of the present invention and the comparative examples used in Test 4 (waveform 1, direction of circle)

|  | Example | | | | Comparative example | | |
| --- | --- | --- | --- | --- | --- | --- | --- |
|  | 54 | 55 | 56 | 57 | 58 | 59 | 60 |
| Size of cylindrical member |  |  |  |  |  |  |  |
| Maximum outer diameter (mm) | 140 | 140 | 140 | 140 | 150 | 140 | 140 |
| Minimum inner diameter (mm) | 50 | 50 | 50 | 50 | 130 | 50 | 50 |
| Thickness (mm) | 10 | 10 | 10 | 10 | 10 | 10 | 10 |
| Length (mm) | 350 | 350 | 350 | 350 | 350 | 350 | 350 |
| Number of pitches | 6 | 6 | 6 | 6 | 0 | 4 | 4 |
| Average pore diameter (mm) | 0.1 | 0.5 | 1.0 | 0.5 | 0.5 | 0.08 | 1.2 |
| Average number of pores in direction of thickness | 120 | 25 | 13 | 35 | 42 | 140 | 15 |
| Volume package density (%) | 20 | 12 | 8 | 33 | 42 | 8 | 42 |
| Gas inflow filtration area per liter of exhaust (cm$^2$) | 700 | 700 | 700 | 700 | 550 | 550 | 550 |

TABLE 13

Evaluation result in Test 4

| No. | Before collecting | 1 hour later | | 6 hours later | |
|---|---|---|---|---|---|
| Example 54 | 0 | 0.6 | 1.6 | 1.4 | 7.5 | 8.5 |
| Example 55 | 0 | 0.5 | 1.4 | 1.2 | 7.4 | 8.0 |
| Example 56 | 0 | 0.4 | 1.2 | 1.0 | 7.4 | 7.5 |
| Example 57 | 0 | 0.6 | 1.4 | 1.1 | 7.4 | 8.5 |
| Comparative example 58 | 0 | 0.6 | 1.4 | 1.5 | 7.3 | 12.0 |
| Comparative example 59 | 0 | 0.6 | 1.5 | 2.0 | 7.4 | 15.2 |
| Comparative example 60 | 0 | 0.4 | 1.2 | 1.4 | 7.2 | 10.1 |

Amount of particulate collected (g) and pressure drop (KPa)

TABLE 14

Structure of particulate traps of the present invention and the comparative examples used in Test 4 (waveform 1, direction of circle)

| | Example | | | Comparative example | | |
|---|---|---|---|---|---|---|
| | 61 | 62 | 63 | 64 | 65 | 66 |
| Size of cylindrical member | | | | | | |
| Maximum outer diameter (mm) | 140 | 140 | 140 | 140 | 150 | 150 |
| Minimum inner diameter (mm) | 50 | 50 | 50 | 120 | 130 | 130 |
| Length (mm) | 350 | 350 | 350 | 350 | 350 | 350 |
| Thickness (mm) | 10 | 10 | 10 | 10 | 10 | 10 |
| Number of pitches | 3 | 5 | 7 | 0 | 0 | 0 |
| Average pore diameter (mm) | 0.5 | 0.5 | 0.5 | 0.5 | 0.5 | 0.08 |
| Average number of pores in direction of thickness | 27 | 27 | 20 | 35 | 8 | 140 |
| Volume package density (%) | 12 | 12 | 12 | 20 | 10 | 8 |
| Gas inflow filtration area per liter of exhaust (cm$^2$) | 440 | 570 | 720 | 400 | 600 | 600 |

TABLE 15

Evaluation result in Test 5

| No. | Before collecting | 1 hour later | | 6 hours later | |
|---|---|---|---|---|---|
| Example 61 | 0 | 0.5 | 1.5 | 1.4 | 7.2 | 8.5 |
| Example 62 | 0 | 0.5 | 1.6 | 1.2 | 7.3 | 8.0 |
| Example 63 | 0 | 0.5 | 1.5 | 1.0 | 7.2 | 7.1 |
| Comparative example 64 | 0 | 0.6 | 1.5 | 1.6 | 7.3 | 11.2 |
| Comparative example 65 | 0 | 0.5 | 1.5 | 1.5 | 7.1 | 10.5 |
| Comparative example 66 | 0 | 0.7 | 1.7 | 2.0 | 7.0 | 13.0 |

Amount of particulate collected (g) and pressure drop (KPa)

TABLE 16

Composition of three-dimensional mesh-like porous members used in Test 6 and skeleton deterioration after regenerating

| | Composition of porous member (wt %) | | | Framework surface after 500 |
|---|---|---|---|---|
| No. | Ni | Cr | Al | regenerations |
| Example 67 | 50 | 50 | — | No damage |
| Example 68 | 80 | 20 | — | No damage |
| Example 69 | 65 | 35 | — | No damage |
| Example 70 | 75 | 24 | 1 | No damage |
| Example 71 | 85 | 12 | 6 | No damage |
| Example 72 | 50 | 44 | 6 | No damage |
| Example 73 | 70 | 24 | 6 | No damage |
| Comparative example 74 | 87 | 13 | — | Brittle scale appeared |
| Comparative example 75 | 70 | 20 | 10 | Not cylindrically workable |
| Comparative example 76 | 60 | 39.5 | 0.5 | Brittle scale appeared |
| Comparative example 77 | 80 | 10 | 10 | Not workable |
| Comparative example 78 | 70 | 29.5 | 0.5 | Brittle scale appeared |

We claim:

1. The combination of a diesel engine having an exhaust line, and a particulate trap for filtering particulates from exhaust gas of the diesel engine, said particulate trap including a case having an inlet and an outlet mounted to said exhaust line of the diesel engine such that said particulate trap is disposed in-line with said exhaust line, and a filter comprising at least one filter element mounted in said case, each said filter element being a porous member of a heat-resistant metal framework having the form of a three-dimensional mesh, said porous member being tubular so as to have an outer surface and an inner surface, the pores of said porous member defining passageways extending between and open to said inner and said outer surfaces, said porous member extending longitudinally in a direction in which exhaust gas flowing through said exhaust line passes from said inlet to said outlet of the case, the surface roughness of the metal of said metal framework being at least 0.2 μm as expressed in terms of Rmax, the pores of said porous member having an average diameter of 0.1–1 mm, the average number of said pores as counted in the direction of thickness of said porous member being at least 10, the amount of space occupied by said metal framework to the entire volume of space occupied by said porous member being 10–40%, and said porous member having a gas inflow filtration area of 400 cm$^2$ or more per liter of the displacement of said diesel engine.

2. The combination of a diesel engine and particulate trap as claimed in claim 1, wherein the projected width of the sections of said metal framework between adjacent ones of said pores is at least 20 μm.

3. The combination of a diesel engine and particulate trap as claimed in claim 1, wherein said filter comprises a plurality of said filter elements spaced from one another side-by-side in the case, and said trap also includes closure members, said closure members closing each of the ends of said filter elements closest to one of said inlet and said outlet of the case in said direction in which exhaust gas flows through said case, and said closure members closing a gap between an inner surface of said case and other ends of the filter elements closest to the other of said inlet and said outlet in said direction in which exhaust gas flows through said case.

4. The combination of a diesel engine and particulate trap as claimed in claim 1, wherein said filter comprises a plurality of said filter elements disposed concentrically in the case and spaced from one another so as to define gaps therebetween, and said trap also includes closure members, said closure members closing alternate ones of a gap between an inner surface of said case and an end of the radially outermost one of the concentric filter elements, gaps between adjacent ones of said filter elements, and an end of the radially innermost one of said filter elements, at each of the ends of said porous members, only one end of the radially innermost filter element being closed by said closure members.

5. The combination of a diesel engine and particulate trap as claimed in claim 1, wherein said filter element has a corrugated sectional shape, and said trap includes closure members, said closure members closing one end of said filter element closest to one of said inlet and said outlet in the direction in which exhaust gas flows through said case, and said closure members closing a gap between an inner surface of said case and the other end of said filter element closest to the other of said inlet and said outlet in said direction in which exhaust gas flows through said case.

6. The combination of a diesel engine and particulate trap as claimed in claim 1, wherein said heat-resistant metal is an Ni-based alloy containing Ni: 50–80% by weight and Cr: 20–50% by weight.

7. The combination of a diesel engine and particulate trap as claimed in claim 2, wherein said heat-resistant metal is an Ni-based alloy containing Ni: 50–80% by weight and Cr: 20–50% by weight.

8. The combination of a diesel engine and particulate trap as claimed in claim 3, wherein said heat-resistant metal is an Ni-based alloy containing Ni: 50–80% by weight and Cr: 20–50% by weight.

9. The combination of a diesel engine and particulate trap as claimed in claim 4, wherein said heat-resistant metal is an Ni-based alloy containing Ni: 50–80% by weight and Cr: 20–50% by weight.

10. The combination of a diesel engine and particulate trap as claimed in claim 5, wherein said heat-resistant metal is an Ni-based alloy containing Ni: 50–80% by weight and Cr: 20–50% by weight.

11. The combination of a diesel engine and particulate trap as claimed in claim 1, wherein said heat-resistant metal is an Ni-based alloy containing Ni: 50–85% by weight, Cr: 15–50% by weight and Al: 1–6% by weight.

12. The combination of a diesel engine and particulate trap as claimed in claim 2, wherein said heat-resistant metal is an Ni-based alloy containing Ni: 50–85% by weight, Cr: 15–50% by weight and Al: 1–6% by weight.

13. The combination of a diesel engine and particulate trap as claimed in claim 3, wherein said heat-resistant metal is an Ni-based alloy containing Ni: 50–85% by weight, Cr: 15–50% by weight and Al: 1–6% by weight.

14. The combination of a diesel engine and particulate trap as claimed in claim 4, wherein said heat-resistant metal is an Ni-based alloy containing Ni: 50–85% by weight, Cr: 15–50% by weight and Al: 1–6% by weight.

15. The combination of a diesel engine and particulate trap as claimed in claim 5, wherein said heat-resistant metal is an Ni-based alloy containing Ni: 50–85% by weight, Cr: 15–50% by weight and Al: 1–6% by weight.

16. The combination of a diesel engine and particulate trap as claimed in claim 1, wherein said trap also includes an electric heater disposed in said case to burn particulates collected by said at least one filter element.

17. The combination of a diesel engine and particulate trap as claimed in claim 2, wherein said trap also includes an electric heater disposed in said case to burn particulates collected by said at least one filter element.

18. The combination of a diesel engine and particulate trap as claimed in claim 3, wherein said trap also includes an electric heater disposed in said case to burn particulates collected by said filter elements.

19. The combination of a diesel engine and particulate trap as claimed in claim 4, wherein said trap also includes an electric heater disposed in said case to burn particulates collected by said filter elements.

20. The combination of a diesel engine and particulate trap as claimed in claim 5, wherein said trap also includes an electric heater disposed in said case to burn particulates collected by said at least one filter element.

21. The combination of a diesel engine and particulate trap as claimed in claim 6, wherein said trap also includes an electric heater disposed in said case to burn particulates collected by said at least one filter element.

22. The combination of a diesel engine and particulate trap as claimed in claim 11, wherein said trap also includes an electric heater disposed in said case to burn particulates collected by said at least one filter element.

* * * * *